United States Patent
Takahashi et al.

(10) Patent No.: US 6,778,235 B2
(45) Date of Patent: Aug. 17, 2004

(54) LIQUID CRYSTAL DISPLAY APPARATUS HAVING LIGHT PIPE WITH REFLECTIVE POLARIZER

(75) Inventors: Naoki Takahashi, Osaka (JP); Seiji Umemoto, Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 178 days.

(21) Appl. No.: 10/079,577

(22) Filed: Feb. 22, 2002

(65) Prior Publication Data

US 2003/0160917 A1 Aug. 28, 2003

(51) Int. Cl.$^7$ .......................... G02F 1/1335; F21V 7/04
(52) U.S. Cl. ............................................ 349/65; 362/31
(58) Field of Search ............................. 349/65; 362/26, 362/31

(56) References Cited

U.S. PATENT DOCUMENTS

| | | | | |
|---|---|---|---|---|
| 5,856,855 A | * | 1/1999 | Mol et al. ..................... | 349/65 |
| 5,917,565 A | * | 6/1999 | Suzuki ......................... | 349/65 |
| 6,124,906 A | * | 9/2000 | Kawada et al. ................ | 349/65 |
| 6,199,995 B1 | * | 3/2001 | Umemoto et al. ............. | 362/31 |
| 6,222,598 B1 | * | 4/2001 | Hiyama et al. ................ | 349/65 |
| 6,359,670 B1 | * | 3/2002 | Broer et al. .................. | 349/115 |
| 6,459,461 B1 | * | 10/2002 | Umemoto et al. ............. | 349/65 |
| 6,590,625 B1 | * | 7/2003 | Umemoto et al. ............. | 349/65 |
| 2003/0147042 A1 | * | 8/2003 | Kawamoto et al. ......... | 349/194 |

* cited by examiner

Primary Examiner—Tarifur R. Chowdhury
(74) Attorney, Agent, or Firm—Westerman, Hattori, Daniels & Adrian LLP

(57) ABSTRACT

A liquid crystal display apparatus has a light pipe for emitting an incident light coming from the light source from a lower surface via a light emitting means formed on an upper surface, a reflection type polarizer disposed on the lower surface of the light pipe, the reflection type polarizer dividing an incident natural light into a circularly polarized reflected light and a transparent light, and the reflected light being emitted thorough the upper surface of the light pipe, and a liquid crystal shutter disposed on the upper surface of the light pipe, and having a liquid crystal cell and at least one sheet of polarizer.

14 Claims, 3 Drawing Sheets

LIQUID CRYSTAL DISPLAY APPARATUS HAVING LIGHT PIPE WITH REFLECTIVE POLARIZER

BACKGROUND OF THE INVENTION

1. Field of the Invention

The present invention relates to a liquid crystal display apparatus excellent in light utilizing efficiency, bright and easy to see a display.

2. Description of the Related Art

Such a liquid crystal display apparatus for both of reflection and transmission has been investigated which is added with an illumination device to be visually recognized as a transmission type liquid crystal display apparatus at dark places, as making the most of merits of a reflection type liquid crystal display apparatus less to consume electricity. There has been proposed an apparatus equipped with a semi transmission type reflecting plate between a back light and a liquid crystal cell in the transmission type liquid crystal display apparatus. However a system making use of the semi transmission type reflecting plate has brought a problem that since a light is divided into a reflected light and a transparent light owing to a half mirror effect, a brightness does not come up to a brightness exclusive for reflection or transmission in either mode of reflection and transmission.

In view of the above mentioned states, an improvement has been also proposed using a reflection type polarizer where polarization is selectively reflected and a total of reflectance and transmissivity can be beyond 100%. But, a problem is that owing to difference in polarization characteristic (a polarizing plane of linear polarization is 90° different) in the reflected light and the transparent light, displays by the reflection mode and the transmission mode are inverted, and as the reflection mode is dark under twilight, if turning to the transmission mode, a contrast is made unstable by inversion of the display, and displays in either mode are not easy to see.

On the other hand, another problem is that if brightening in the transmission mode, blackness of a black display lacks to lower the contrast, and if a light absorbing substance is arranged for preventing the black display from insincerity, the display becomes dark by the light absorption thereby.

SUMMARY OF THE INVENTION

The invention has a theme to develop such a liquid crystal display apparatus of good visibility being excellent in bright-ness under both modes of reflection and transmission, not causing inversion of the display, and excellent in contrast even under twilight or the like.

The invention is to offer a liquid crystal display apparatus, characterized by providing a reflection type polarizer which emits an incident light coming from a light source disposed on an incident side face from a lower surface via a light emitting means formed on an upper surface, divides an incident natural light into a reflected light and a transparent light at the lower surface side, and supplies the reflected light made of a circularly polarized light, and disposing a liquid crystal shutter having a liquid crystal cell and at least one sheet of polarizer on the upper surface side of a light pipe passing the reflected light from the upper surface.

According to the invention, since the liquid crystal display is accomplished through an external light by the reflection type polarizer of the lower surface of the light pipe or reflected light of an emitting light from the light pipe, it is possible to provide such a liquid crystal display apparatus of good visibility being excellent in brightness under both modes of reflection and transmission, not causing inversion of display, and excellent in contrast even under twilight or the like, in which the display is not inverted owing to differences of polarization characteristic in both modes of reflection and transmission, and the contrast is not influenced by leakage light from the light pipe.

Further, by supplying the reflected light comprising the circularly polarized light, the display having the excellent contrast in both modes of reflection and transmission can be accomplished even in a system of arranging a single layer of the polarizer omitting a visually rear side, and brightness can be also improved by reduction of absorption loss by omitting the visual rear side. Accordingly it is possible to accomplish the display by far heightening the contrast than an existing reflection type liquid crystal display apparatus of the system of arranging a single layer of the polarizer including a matter to become a circularly polarized light after the external light passes through the cell, and it is possible to add a displaying function by the transmission mode.

As light emitting means is installed on the upper surface, an optical path within the light pipe can be lengthened in the transmission mode, so that light can be largely expanded to enable to moderate strength of bright line and advantageously serve to prevent moire and improve uniformity of brightness, and the reflection type polarizer can be closely and easily attached as one body to the lower surface of the light pipe via an adhesive layer. In case the light emitting means is provided to the lower surface of the light pipe, the reflection type polarizer should be separately located from the viewpoint of maintaining the function of the light emitting means, and a structure is complicated by locating and fixing it together with increase of the number of parts, and wrinkles appear to demand a thick support for avoiding disturbance of display so that a difficulty occurs of heavy weight.

In the case of the light pipe having the light emitting means comprising obliquity of prismatic structures, the inventive liquid crystal display apparatus is excellent in directivity of reflected light coming through the obliquity, and can effectively form light useful to visibility in the transmission mode and realize a brighter display, and this is excellent in injection efficiency of an external light and transmission efficiency after reflection, so that even in the reflection mode it is possible to provide a brighter display by emission surpassing uniformity. The moire occurrence owing to directivity can be restrained by the oblique arrangement of the light emitting means, thereby enabling to avoid glittering obstacle of visual recognition.

In the light pipe having the above mentioned scattering type emitting means of dotting- or crimping-like structures, light is emitted at a large angle of about 60 degrees, so that a front (vertical) direction becomes a dark transmission mode difficult to see. If a prism sheet is laid aiming at controlling the optical path, light in the reflection mode is scattered and is scarcely contributed to the visual recognition and makes a very dark display. In addition, if dots are clearly seen and a diffusing layer having a strong diffusion is disposed for avoiding dot scattering, the reflected light by the incident light in the reflection mode and the reflecting layer thereof is also scattered to turn out a dark display.

Features and advantages of the invention will be evident from the following detailed description of the preferred embodiments described in conjunction with the attached drawings.

DETAILED DESCRIPTION OF THE PREFERRED EMBODIMENTS

The liquid crystal display apparatus according to the invention comprises the reflection type polarizer which emits an incident light coming from a light source disposed on the incident side face from the lower surface of the apparatus via a light emitting means formed on the upper surface thereof, divides an incident natural light into a reflected light and a transparent light at the lower surface side, and supplies the reflected light of a circularly polarized light, and disposing a liquid crystal shutter having a liquid crystal cell and at least one sheet of polarizer on the upper surface side of a light pipe transmitting the reflected light from the upper surface, and maybe preferably used for both of reflection and transmission.

Figure 1:
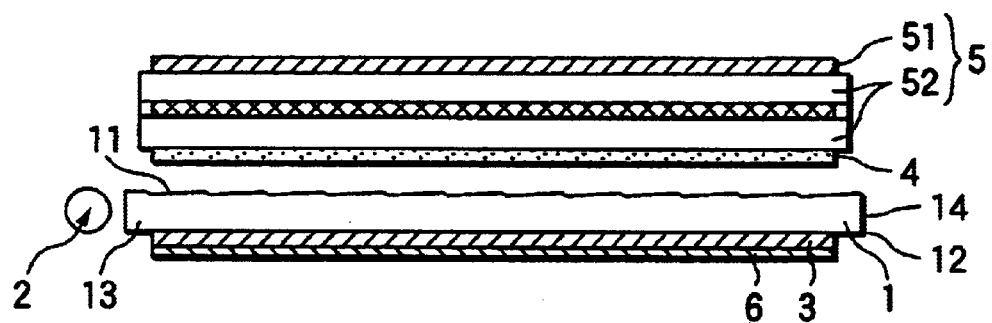
FIG. 1 shows an explanatory cross sectional view of the example of the liquid crystal display apparatus.

The example of the above mentioned liquid crystal display apparatus is shown in FIG. 1. In the same, reference numeral 1 designates the light pipe, 11 shows the upper surface formed with the light emitting means of the light pipe, 2 is a light source, 3 is the reflection type polarizer, 5 is a liquid crystal shutter, 51 is a polarizer, 52 is a liquid crystal cell, and 4, 6 are respectively a light diffusing layer and a light absorbing layer of polarization maintaining property in response to request.

The light pipe comprises, as seen in FIG. 1, a plate like material having the upper surface 11, the lower surface 12 opposite thereto and the incident side face 13 being a side face between the upper and lower surfaces, and an incident light is emitted from the lower surface 11 via the light emitting means formed on the upper surface.

The light pipe may have the same thickness as illustrated, or it is also sufficient that the thickness of an edge 14 opposite to the incident side face 13 is thinner than that of the face 13. The thinner opposite edge is useful to lightening of weight or improving of injection efficiency of the incident light from the incident side face into the light emitting means of the upper surface.

The light emitting means formed on the upper surface of the light pipe may be formed with an appropriate substance showing the above mentioned emitting characteristic. From the viewpoint of obtaining an illuminating light having an excellent directivity in a front direction via the reflection type polarizer, preferable is such a light emitting means having an oblique face opposite to the incident side face, and more preferable is the light emitting means comprising a prismatic structure.

The prismatic structures may be formed with roughness of equal sides, but preferably formed with those of short and long sides from a point of light using efficiency. An example of the prismatic structures is shown in FIG. 2. 11a is the short side face and 11b is the long side face.

Figure 2:
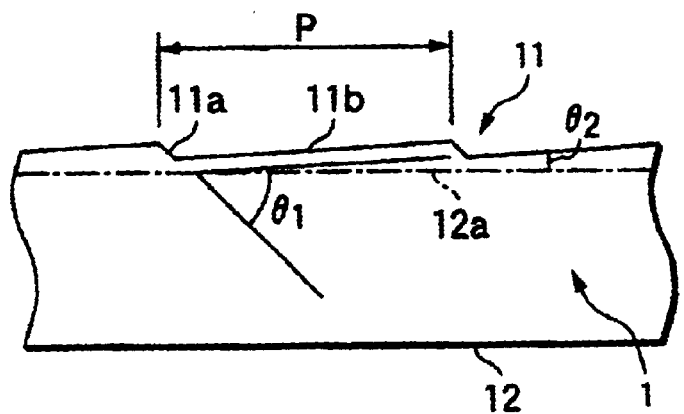
FIG. 2 shows an explanatory side view of the light emitting means in the light pipe.

For accomplishing characteristics such as directivity in the front face direction, preferable light emitting means has a structure which repeats a tilt angle having obliquity of 35 to 45 degrees and the flat faces of 10 degrees or less with respect to a reference flat plane of the lower surface, and in particular, as shown in FIG. 2, such a structure which repeats the prismatic structures comprising the tilt angle having obliquity of 35 to 45 degrees to the reference flat plane 12a of the lower surface 12, the short side face 11a ($\theta$1) tilting from the incident side face 13 toward the side of the opposite edge 14, and the long side face 11b ($\theta$2) having the tilt angle being 0 to 10 degrees.

In the above mentioned, the short side face 11a formed as the obliquity tilting downward from the incident side face to the opposite edge, plays a role of reflecting a light among the incident light from the side face, which (a light) injects to said face, and supplying it to the lower surface (the reflection type polarizer). In this case, if the tilt angle $\theta$1 of the short side face 11a is set to be 35 to 45 degrees, as exemplifying with bent arrow marks in FIG. 3, the tilt angle reflects a transmitting light to the lower surface with good verticality, and can obtain the emitting light (illuminating light) excellent in directivity to the front face via the reflection type polarizer 3.

The preferable tilt angle $\theta$1 of the short side face is 38 to 44 degrees, above all 40 to 43 degrees from the viewpoint of the above mentioned directivity to the front face, taking it into consideration that all reflecting conditions based on refraction by the Snell's law are, for example, ±41.8 degrees in the refractive index being 1.5.

Figure 3:
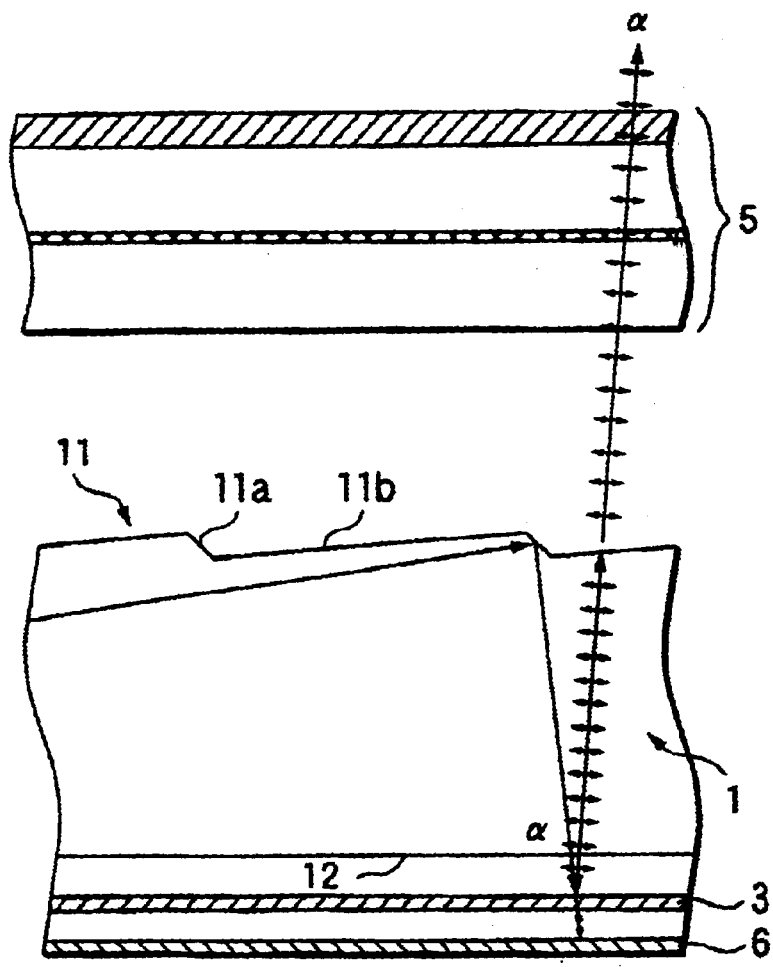
FIG. 3 shows an explanatory view under visually recognizing condition of the transmission mode.
Figure 4:
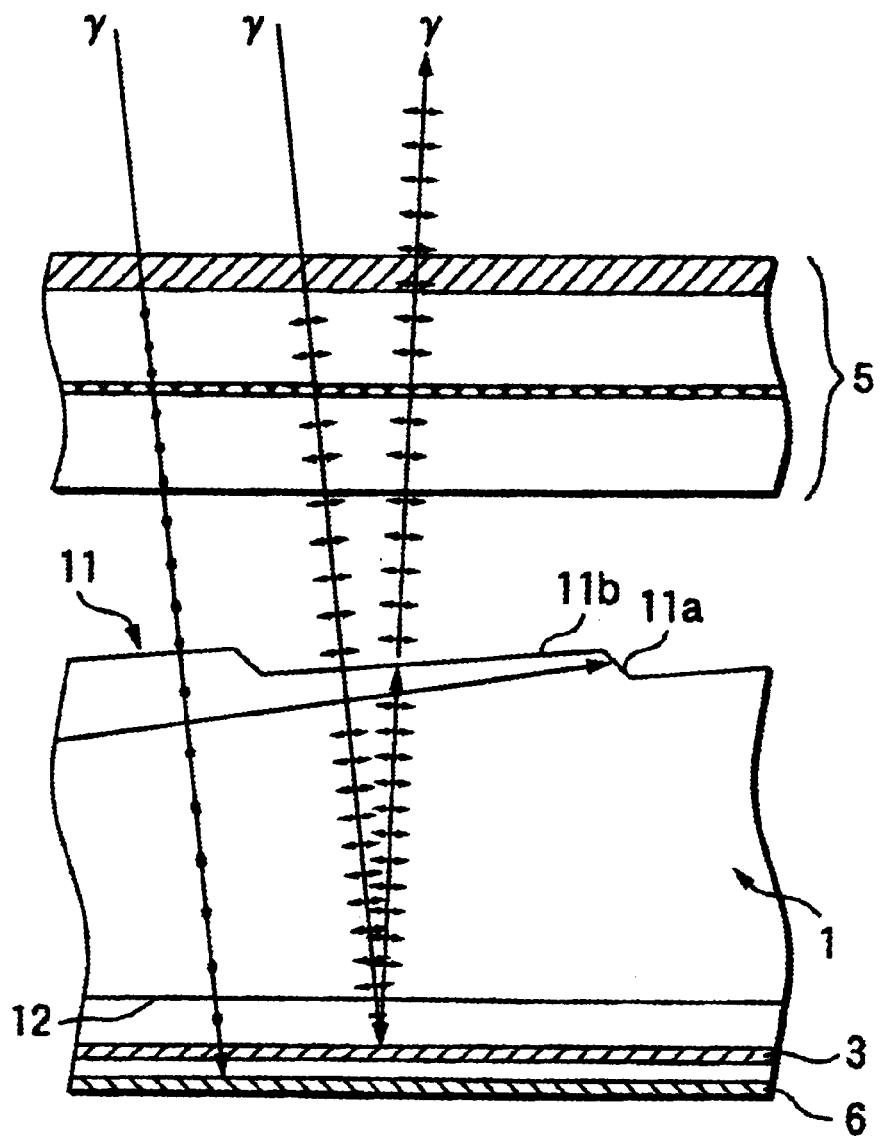
FIG. 4 shows an explanatory view under visually recognizing condition of the reflection mode.

On the other hand, the long side face aims, as exemplified with the bent arrow marks in FIG. 3, at that the reflected light by the short side face is inverted via the reflection type polarizer 3 and transmitted, and as exemplified with the bent arrow marks in FIG. 4, aims at that an external light in the reflection mode is injected, inverted via the reflection type polarizer 3 and transmitted. In view of these regards, the tilt angle $\theta$2 of the long side face to the reference flat plane 12a of the lower surface is preferably 10 degrees or less. If being more than 10 degrees, variation of the optical path is large by refraction, and the quantity of light goes down to be disadvantageous to the display.

The tilt angle $\theta$2 of the long side face may be 0 degree (horizontal face), and if exceeding 0 degree, when the transmitting light injecting into the long side face is reflected and supplied to the short side face, the transmitted light can be changed to a parallel light, so that the directivity of the reflected light via the short side face can be heightened to be advantageous to the display. From the viewpoint of the increase of the quality of light in the front direction and the change into the parallel light, the preferable tilt angle $\theta$2 of the long side face is 8 degrees or less, above all 5 degrees or less.

From the viewpoint of the function of the long side face of the above mention light pipe, the preferable long side face has difference in angle of the tilt angle $\theta$2 being within 5 degrees, above all within 4 degrees and particularly within 3 degrees in the whole of the light pipe, and the difference in the tilt angle $\theta$2 in the nearest side faces is within 1 degree, above all 0.3 degrees and particularly 0.1 degrees.

The difference in the tilt angle $\theta$2 is based on a premise that the tilt angle of the long side face is 10 degrees or less, that is, on the premise of restraining, as such a small tilt angle $\theta$2, a deflection of a displayed image by refraction when passing through the long side face so as to be within a tolerance. This manner aims at not changing an optimum visual direction of the liquid crystal display apparatus optimized by determining an observing point in the vicinity of the vertical direction.

Preferable is such a tilt angle excellent in the incident efficiency of the external light and in the transmission of the displayed image by the liquid crystal cell for obtaining bright displayed images. In view of this regard, it is desirable that a projected area of the long side face to the reference flat plane of the lower surface is the prismatic structures of 5 times or more, above all 10 times or more, especially 15 times or more of the projected area of the short side face. It is thereby possible to pass a major part of the displayed image by the liquid crystal cell through the long side face.

For transmitting the displayed image by the liquid crystal cell, the displayed image injected on the short side face is reflected on the incident side, and is not emitted from the upper surface or is polarized in a largely different direction of the opposite edge side from the displayed image having passed through the long side face on the basis of a normal line with respect to the lower surface and emitted, so that influences are scarcely given by the displayed image through the long side face.

Accordingly, it is preferable that the short side face is not localized to a pixel of the liquid crystal cell. Incidentally, to say extremely, if the short side face overlaps allover the pixel, the displayed image via the long side face is scarcely recognized in the vicinity of the vertical direction. Thus, for preventing unnatural displays owing to shortage in transmission of the displaying light, it is desirable to reduce an area overlapping the pixel and the short side face, and secure an enough light transmission through the long side face.

The pixel pitch of the liquid crystal cell is in general 100 to 300 $\mu$m, and when taking the above mentioned points or the formability of the prismatic structures into consideration, the short side face is preferably formed to be 40 $\mu$m or less, above all 1 to 20 $\mu$m, especially 3 to 15 $\mu$m in accordance with the projected width of the lower surface to the reference flat plane.

By the way, the smaller the projected width, the higher technique is requested for forming the short side face, and if an apex of the prismatic structures has roundness comprising radius of curvature of more than a fixed degree, diffusing effect appears to probably cause disturbance in the displayed image. Since coherent length of a fluorescent tube is around 20 $\mu$m, if the projected width of the short side face is small, diffraction is easy to occur to lower the displayed quality than that.

Although it is preferable that the short side faces have a large space therebetween, since the short side face is, on the other hand, a substantial part of the emit functioning of the incident light from the side face as mentioned above, if the space is too wide, an illumination is sparse when lighting, and the display is often unnatural, and when viewing these facts, the repeating pitches P of the prismatic structures are preferably set to be 50 $\mu$m to 1.5 mm.

The repeating pitches of the prismatic structures maybe irregular as, for example, random pitches, or random or irregular combination of pitch units of determined number, but in general, fixed pitches are desirable in view of measure preventing the moire or good outer appearances when the patterns of the moire are visually recognized.

In the case of the light emitting means comprising the prismatic structures, it interferes with the pixel of the liquid crystal cell and sometimes generates the moire. The moire is prevented by adjusting pitches of the prismatic structures, and there is a preferable range in the pitch of the prismatic structures. Accordingly, a problem is a measure resolving the case of generating the moire in such a range.

In the invention, a preferable moire preventing system is to form the prismatic structures in an oblique condition to the reference flat plane of the incident side face, so that the prismatic structures are arranged in a crossing state with respect to the pixel. In this case, if the tilt angle is too large, a deflection occurs in the reflection via the short side face and a large separation is generated in the emitting direction, so that anisotropy of luminous intensity grows large in the light transmitting direction of the light pipe and the light using efficiency goes down to easily decrease the displayed quality.

For the above mentioned points, the arranging direction of the prismatic structures to the reference flat plane of the incident side face, that is, the tilt angle in the ridged direction of the prismatic structures, is preferably within ±35 degrees, above all within ±30 degrees, especially within ±25 degrees. The mark of "±" is meant by the tilting direction on the basis of the incident side face. As the image resolution of the liquid crystal cell is low, the moire does not appear, and when the moire is ignored, the more parallel with the incident side face is the arranging direction the prismatic structures, the more preferable.

The light pipe may be shaped appropriately. When forming a wedge, shapes may be determined as liked, and any shapes as a linear face or a curved face are sufficient. Further, the obliquity for forming the light emitting means and the prismatic structures may be formed in any shapes in the linear face, the refracted or curved faces.

Further, the prismatic structures are sufficient with combination different in shape in addition to pitches. Besides, the prismatic structures may be formed with a series of concave parts or convex parts having a continuous ridge line, or intermittent concave parts or convex parts of discontinuous arrangement with fixed spaces.

As to shapes of the lower surface or the incident side face of the light pipe, any special limitation is not specified but maybe determined as liked. In general, the lower surface is flat, while the incident side face is vertical with respect to said lower surface. The incident side face is shaped in response to an outer periphery of the light source, for example, curved concave shape for increasing a percentage of the incident light. A structure of the incident side face having an introducing part intervening between the light source and the light pipe is sufficient, and the introducing part may have any shapes in response to the light source.

The light pipe can be formed with a suitable material replying to range of wavelength of the light source and showing transparency thereto. Incidentally, in a visible range, listed is transparent resins or glass represented by acrylic resin, polycarbonate resin or epoxy resin. Preferably used is such a light pipe not showing double refraction or of small double refraction.

The light pipe can be formed by a machining process or another proper process. As good making methods from the viewpoint of mass production, there are a method of urging a heated thermoplastic resin into a metal mold enabling to form desired shapes for transcribing a shape, another method of charging a heated and fused thermoplastic resin or a fluidized resin by heating or via a solvent into the metal mold enabling to form desired shapes, or a further method of charging or flow-expanding a liquid resin enabling to be polymerized by heat, ultraviolet or radial ray into the metal mold enabling to form desired shapes.

The light pipe may be formed, for example, as a laminated body of a part comprising a homogeneous or heterogeneous material as if attaching a sheet formed with the light emitting means (upper surface) of the prismatic structures to the light introducing part serving to transmit light, and it is not always necessary to form the light pipe as an integral single layer of one kind material.

The thickness of the light pipe may be conveniently determined by a size of the light pipe or a dimension of a using purpose. The general thickness for forming the liquid crystal display apparatus is 5 mm or less, above all 0.1 to 3 mm, especially 0.3 to 2 mm in accordance with the incident side face.

For accomplishing the bright display, a preferable light pipe before furnishing the reflection type polarizer is that the incident light in the upper and lower directions, in particular, the transmission of total light rays of the vertical incident light from the lower surface to the upper surface is 90% or more, above all 92% or more, especially 95% or more, and heiz is 30% or less, above all 15% less, especially 10% or less.

According to the above mentioned light pipe, it is possible to form various kinds of instruments such as the liquid crystal display apparatus for both of reflection and transmission, which is easy to see and superior in the low power consumption and which well passes the incident light coming from the upper and lower surfaces through the lower surface or the upper surface, emits the light made parallel precisely by using the light pipe in a direction excellent in verticality being better for visual recognition, efficiently utilizes the light from the light source.

In the liquid crystal display apparatus for both of reflection and transmission, the reflection type polarizer is indispensably disposed for accomplishing the display by the reflection mode, but in the invention, the reflection type polarizer is disposed on the lower surface 12 of the light pipe 1 as exemplified in FIG. 1. The reflection type polarizer 3 may be separately located at the lower surface of the light pipe, but the close adhesion on the lower surface as shown is desirable from the viewpoint of setting-up efficiency of the emitted light from the light pipe up efficiency of the liquid crystal display apparatus by handling as one body. The closely adhering process may be carried out by a convenient practice as a manner through adhering means such as an adhesive layer or other binding layer.

As the reflection type polarizer, suitable instruments are employed which divide the incident natural light into the reflected light and the transparent light, and supply the reflected light comprising the circularly polarized light. By the way, as an example thereof, as a material supporting, on a film base material, cholesteric liquid crystal layer, above all, an oriented film of cholesteric liquid crystal polymer or an oriented liquid crystal layer, such a substance may be enumerated which shows a characteristic reflecting either of left and right circularly polarized light and passing the other light.

The cholesteric liquid crystal layer may be formed as a single layer, but if piling two layers or three layers or more one on another in combination of different reflecting wave lengths, the circularly polarized light can be reflected in ranges of wide wavelength as the visible range. Accordingly, the reflection type polarizer comprising the cholesteric liquid crystal layer may have a structure of such piling arrangement.

As the above mentioned reflection type polarizer, such as multi layer film of one kind or two kinds or more of double refractive organic film or dielectric multi layer film, a taken up example is a combination of a polarizer showing characteristic of reflecting the linear polarization and passing the other light as well as ¼ wavelength plate. In this case, if the reflected light comprising the linear polarization passes through the ¼ wavelength plate, it is inverted into the circularly polarized light for utilization. Therefore, the ¼ wavelength plate is interposed between the reflecting plate and the liquid crystal shutter, and in general it is interposed between the reflecting plate and the light pipe.

As the above mentioned ¼ wavelength plate, such materials are usable which have a retardation suitable for changing the linear polarization into the circularly polarized light. A wavelength plate functioning as the ¼ wavelength plate in the wide wavelength scope of the visible light range, may be obtained by piling, e.g., to a monochromatic light having the wave length such as 550 nm, a layer of retardation functioning as the ¼ wavelength plate and a layer of retardation showing characteristic of other retardation, for example, ½ wavelength. Therefore, the ¼ wavelength plate may comprise the layer of the retardation of one layer or two layers or more.

Incidentally, the above mentioned layer of the retardation is obtained as a double refractive film comprising a drawn film of several kinds of polymers, an oriented film of liquid crystal polymer such as discotic or nematic system, or a film supporting, on a film base material, said oriented liquid crystal layer. The drawn film may be processed by a convenient practice as a uniaxial or biaxial system, or the double refractive film controlling the refraction rate in the film thickness direction by a practice imparting shrinkage force and/or drawing force under adhesion with the thermal shrinkage film.

The polymer for forming the double refractive film maybe, for example, polyethylene or polypropylene, olefin based polymer such as polyolefin having norbornane structure, polyester based polymer, acrylic or cellulose based polymer such as polymethylmethacrylate, polyamide, polyimide, poly sulfone, polyethersulfone, polyetheretheretherketon or poly phenylene sulfide, polyvinyl alcohol, poly vinyl chloride, poly vinylbutylate or polycarbonate, polystyrene or polyarylate, or polyoxymethylene.

By disposing, at the lower surface side of the light pipe, the reflection type polarizer which divides the incident natural light into the reflected light and the transparent light and supplies the reflected light comprising the circularly polarized light, it is possible to supply to the liquid crystal shutter the external light by the reflection mode and the emitted light from the light pipe by the transmission mode as the circularly polarized light by reflection. Further, by means of a practice disposing the polarizer of the single layer omitting the polarizer of a visually back side (the side of the light pipe), it is possible to accomplish the display excellent in the contrast in both modes of the reflection and the transmission, and heighten the brightness owing to reduction of the absorption loss by omitting the polarizer.

The reflection type polarizer may be a sort of generating the diffusing reflection for preventing the moire by moderating the bright intensity or heightening uniformity of the display. As the diffusion intensity disadvantageously largely decreases the directivity of the emitted light from the light pipe or dissolves the polarizing condition, preferable is around 5 to 15 degrees on the basis of the average diffusion degree, but no limitation is made thereto.

The reflection type polarizer of the diffusion type may be formed by a conventional appropriate practice such as roughing the reflecting surface, for example, by an embossing process, a mechanical system of a buff treatment, a system for causing layers to contain inorganic or organic particles, or a system of coating the containing layer.

If the light having passed through the reflection type polarizer takes part in the display by reflection from a casing or others outside the apparatus, the contrast might be decreased owing to differences in the polarizing direction, and for preventing the displaying quality from decreasing, a light absorbing layer 6 may be, if required, furnished as shown at the side of the light transmission of the reflection type polarizer for absorbing the passed light. In this case, the invention has a merit that as the light absorbing layer is furnished at the side of the light transmission of the reflection type polarizer, not intervening in the path of the reflected light becoming the displaying light, the light absorbing layer does not influence the black display.

For forming the liquid crystal display apparatus, as exemplified in FIG. 1, the light source 2 is arranged at the incident side 13 of the light pipe 1 for carrying out back light of side light type. Suitable light sources may be desirably employed, for example, a linear light source of cathode tubes (cold, hot), a point light source of light emitting diode, an array arranged with the point light source linearly or in plane, or a light source using a device for inverting the point light source into a linearly emitting condition of fixed or unfixed spaces.

The light source of the invention enables visibility by the transmission mode. Accordingly, when visually recognizing by the reflection mode, since it is not necessary to turn on the light source, the light source can switch light-on and light-out. The switching can employ an arbitrary system and any conventional systems. The light source is previously furnished to the light pipe and may be disposed as the light pipe having the light source.

For forming the liquid crystal display apparatus, as needed, a combination body may be prepared, installing convenient auxiliary instruments such as light source holders surrounding the light source for guiding a divergent light from the light source 2 to the incident side face 13 of the light pipe 1. As the light source holder, generally used is a resin sheet or a metal foil having a metal film of high reflection rate. When the light source holder is adhered to the edge part of the light pipe via an adhesive agent, the edge pat to be adhered may omit forming of the light emitting means.

The liquid crystal display apparatus is in general, as exemplified in FIG. 1, formed by setting up composing parts of the liquid crystal cell 52 with a transference electrode (not shown) functioning as the liquid crystal shutter, a driving device accompanied therewith, the polarizer 51, back lights 1, 2, the reflection type polarizer 3, and a compensating phase retarder, if necessary. In this case, the invention disposes, as requested, the light diffusion layer 4 of polarization maintaining property between the reflection 1 and the liquid crystal shutter 5 as shown.

The light diffusion layer is disposed for diffusing the reflected light of the emitted light from the light pipe or the external light in both modes of transmission and reflection so as to uniform emission and improve visibility. Especially, the invention does not cause the oblique portion of the short side face playing a role of reflecting the incident light from the side face in the light emitting means of the light pipe to emit the reflected light coming from the lower surface from the upper surface. The transmission mode probably generates leakage light to cause bright line or dark line at visual angles, and in such a case, patterns by the light emitting means are clearly seen and spoil the displaying quality, and therefore, the light diffusion layer is disposed to moderate the bright line or the dark line for leveling bright and dark difference and preventing the patterns from the above mentioned visual recognition of the patterns. The leveling of the bright and dark difference is also useful to restraining the moire.

As the light diffusion layer of the invention, such a light diffusion layer of polarization maintaining property is used which maintains the polarizing condition of polarization as soon as possible and diffuses it, and this aims at preventing the brightness or the displaying quality from degradation. That is, as exemplified, when the reflecting circularly polarized light via the reflection type polarizer 3 injects to the liquid crystal cell 52, if depolarizing, a problem of decreasing the displaying quality arises as a loss grows large to decrease the brightness.

As the light diffusion layer of the polarization maintaining property, convenient ones are available, for example, those light diffusion layers which contain beads or transparent particles in translucent resin layer, or contain scattered air bubbles by rapid vaporization of a solvent, otherwise which may maintain the polarizing condition as exemplified with the reflection type polarizer of the translucent resin layer given on the surface with finely rough structure by mechanical treatments or treatment by solvent. Above all, such light diffusion layers are desirable which have excellent light passing degree and diffusion degree whose the polarizing characteristic of the passing light is not rapidly dissolved.

Incidentally, as the degree of the above mentioned polarization maintaining property, those are preferable, for example, which make use of prism polarizers arranged in crossed Nicol and arrange the light diffusion among them, and when a perfect polarization is injected there into, transmissivity of leakage light by depolarization is 2% or less, above all 1.8% or less, especially 1.5% or less. In addition, as the light transmission degree, on the basis of all the light passing degree by use of a integrating sphere, preferable is 80% or more, above all 85% or more, and especially 90% or more.

Since a depolarization is generally caused by the double refraction or multiple scattering, the light diffusing layer showing the polarization maintaining property can be accomplished by, for example, reducing the double refraction as soon as possible, above all lowering the retardation below 30 nm, and decreasing the frequency of average diffusion in the locus of the light ray. From the viewpoint of these points, the light diffusing layer of the polarization maintaining property can be advantageously obtained as a transparent resin layer with transparent particle scattered in the transparent layer and having the finely rough structure on the surface.

As the above mentioned transparent resin, those appropriate of light transmission are used, and above all, for reduction of the double refraction, those of optical isotropy having small double refraction are desirably used such as cellulose triacetate based resin, polymethyl methacrylate, polycarbonate or norbornane based resin.

On the other hand, as the transparent particle scattered in the transparent resin, there are enumerated, for example, inorganic fine particles being sometimes electrically conductive comprising silica or glass, alumina, titania or zirconia, tin oxide, indium oxide, cadmium oxide or antimony oxide, otherwise organic fine particles comprising acrylic polymer or polyacrylonitrile, polyester or epoxy resin, melamine resin, urethane resin, polycarbonate, polystyrene, silicone resin, benzog anamine, cross-linked or non cross-linked polymermelamine.benzog anamine condensed material, benzog anamine.formaldehyde condensed material.

The transparent particles may be used in one kind or two kinds or more, and a diameter is preferably 1 to 20 $\mu$m from the viewpoint of the light diffusion or the uniformity of diffusion. On the other hand, shapes are arbitrary, and generally, circle or secondary aggregate are employed. In particular, for the polarization maintaining property, such transparent particles are preferably used refraction factor with the transparent resin of the optical isotropy being 0.9 to 1.1.

The light diffusion layer containing particles may be formed by conventional appropriate systems, for example, a system mixing transparent particles into a molten resin liquid and extruding in sheet like shape, another system mixing transparent particles into a resin solution or monomer, casting into sheet, and carrying out, as needed, a polymerizing treatment, or a further system coating a resin liquid containing transparent particles on a film supporting a desired face or the polarization maintaining property. Therefore, the transparent resin may comprise the adhesive layer.

On the other hand, the light diffusion layer having the finely rough structure on the surface may be formed by convenient systems, for example, a system roughing the surface of the sheet composed of the transparent resin by means of a buff treating or an emboss-process with sand blasting, or another system forming a layer of the transparent material having projections on the sheet surface.

The finely rough structure of the surface in the light diffusion layer is preferable in those having the surface roughness of more than wavelength of the incident light and less than 100 μm from the viewpoint of the light diffusion and the diffusing uniformity and having no periodicity. For forming the light diffusion layer of the transparent particle containing type or the surface fine roughness type, it is preferable in view of the polarization maintaining property to instantly restrain increase of the retardation owing to photo elasticity of orientation in the base layer composed of the transparent resin.

The light diffusion layer can be arranged one or two sheets or more between the light pipe and the liquid crystal shutter, particularly the liquid crystal cell. In case of arranging two sheets or more, the light diffusion layers may be the same or the different ones, but the whole of the layer should have the polarization maintaining property. The light diffusion layer may be closely integral with an adjacent part, or piled easily separably.

As to the liquid crystal cell for forming the liquid crystal shutter, no especial limitation is made. For example, in case of being based on the orientation of the liquid crystal, suitable ones are used such as twist base of TN liquid crystal cell, STN liquid crystal cell, vertically oriented cell, HAN cell or OCB cell, non twisted base, guest host base, or liquid crystal cell of ferroelectricity liquid crystal base. In addition, as to driving systems of the liquid crystal, no limitation is made, either, and there are suitable driving systems as an active matrix system or a passive matrix system.

Further, as the polarizer, convenient ones may be used, and from the viewpoint of obtaining the display of the favorable contrast ratio by the incident light of the high grade linear polarization, the light pipe of high degree of polarization is preferably used, for example, an absorption type linear polarizer of iodine base or dye base. The polarizer maybe, as shown, provided at one side of the liquid crystal cell 52 or both sides of the liquid crystal cell. For heightening the brightness by reduction of the absorption loss based on the polarizer, it is desirable to provide polarizer at one side of the liquid crystal cell, above all, only at the visually recognizing side.

For forming the liquid crystal display apparatus, suitable optical elements may be disposed, for example, as the light diffusion layer to be placed at the visually recognizing side, an anti glare layer, a protecting layer or a compensating phase retarder. Therefore, the above mentioned light diffusion layer of the polarization maintaining property may be disposed closely to the optical element to be adjacent, and in this case, the light diffusion layer of the polarization maintaining property is furnished as an accompanying layer of a painted layer against the optical element.

The above mentioned compensating phase retarder is, if desired, placed between the polarizer of the visually recognizing side and/or rear side and the liquid crystal cell. But, since the invention rapidly maintains the light emitting characteristic by the light pipe, it is desirable that the optical layer to be disposed between the liquid crystal cell and the light pipe is small. As the compensating phase retarder, a suitable one may be employed in response to the wavelength range, and it may be formed as a piling layer of a retardation layer of one or two layers or more.

The liquid crystal display apparatus according to the invention is visually recognized through the transparent light on the long side face of the light pipe. Incidentally, in the transmission mode, as exemplified with arrows in FIG. 3, under the lighting-on condition of the light source, the light a emitting from the lower surface of the light pipe 1 is reflected via the reflection type polarizer 3 and its circularly polarized light passes through the long side face 11b of the light pipe 1, and a displayed image (α) is visually recognized via the liquid crystal shutter 5. By the way, the light having passed through the reflection type polarizer 3 is absorbed in the light absorbing layer 6.

On the other hand, in the reflection mode, under the lighting-off condition of the light source, as exemplified with arrows in FIG. 4, the external light γ passes through the long side face 11b of the upper surface of the light pipe 1 via the liquid crystal shutter 5, and injects into the reflection type polarizer 3. In this case, the light having passed through the liquid crystal cell is injected as circularly polarized light into the reflection type polarizer, while the white displaying light is reflected on the reflection type polarizer owing to the polarization characteristic and is linearly polarized, and the displayed image (γ) is visually recognized in a course following the transmission mode. The black displaying light passes through the reflection type polarizer and is absorbed in a light absorbing layer 6. As a result, the white and black display excellent in contrast is accomplished.

In the invention, the optical elements or parts such as the light pipe or the light diffusing layer, the liquid crystal cell or the polarizer for forming the liquid crystal display apparatus may integrally and securely piled in combination or partly, or arranged as being easily separated. For preventing the contrast from lowering by restraining an interfacial reflection, the securing condition is preferable. The closely securing treatment may depend on a transparent adhesive agent, and fine particles are contained in the transparent adhesive layer to be an adhesive layer showing the diffusing function.

EXAMPLE 1

The polymethyl methacrylate plate previously formed in a desired shape was machined on the surface with a diamond byte, and the light pipe having the light emitting means on the upper surface was obtained which was width: 40 mm, depth: 25 mm, thickness of the incident side face: 1 mm, thickness of the opposite edge: 0.6 mm, the upper and lower surfaces: flat, the prismatic structures parallel to the incident side face of the upper surface: 210 μm pitched, the tilt angle of the short side face: varied within 42.5 to 43 degrees, the tile angle of the long side face: varied within 1.8 to 3.5 degrees, variance of the tilt angle of the nearest long side face: within 0.1 degree, the projected width to the lower surface of the short side face: 10 to 16 μm, and the ratio of the projected area to the lower surface of the long side face/the short side face: 12 times or more. The light emitting means was formed at the position separate 2 mm from the inject side face.

The light pipe was disposed at the incident side face with cold cathode tubes of 2.4 mm diameter (made by Harrison Electricity Inc.) closely surrounding the upper and lower edges of the light pipe with edges of the light source holder made of a white lamp reflecting sheet, while the cold cathode tubes were connected with an inverter and a DC source, and the light pipe was disposed on the lower surface with the reflection type polarizer made of a cholesteric liquid crystal layer, and the light pipe was disposed on the upper surface with a white and black type liquid crystal shutter not having light pipe of the visually recognized rear side, so that liquid crystal display apparatus was produced. The light source can be switched ON and OFF by turning on and off of the DC source.

EXAMPLE 2

Excepting that the reflection type polarizer was adhered to the lower surface of the light pipe via the acrylic adhesive layer, according to Example 1, the liquid crystal display apparatus was produced.

EXAMPLE 3

The cellulose triacetate film of 80 μm thickness was dispersed on one face with 100 parts (wt part, and the same in the following) of the adhesive agent (solid) and 30 parts of silicone based resin particle of the average diameter being 4 to 10 μm, and located between Gram Thomson prisms of crossed Nicol with the retardation of 4 to 10 μm, and the amount of leakage light by depolarization (the same in the following) was 1.1% of all the incident light, the transmissivity of all the light ray measured with a Heize meter (made by Murakami Color Research Inc., according to JIS 7105) was 94%, and the light diffusion sheet having the adhesive layer of 84% heize in 25 μm thickness was adhered to the visually recognizing rear side of the liquid crystal cell. Other than the above mentioned, the liquid crystal display apparatus was produced following Example 1.

EXAMPLE 4

Excepting that in substitution for the reflection type polarizer, the reflection sheet having the aluminum film was used, and the polarizer was also furnished to the visually recognizing rear side, the liquid crystal display apparatus was produced following Example 2.

EXAMPLE 5

Excepting that the light pipe having the light emitting means which was performed with the sandblast process, was used on the upper surface of the polymethyl methacrylate plate of width: 40 mm, depth: 25 mm, thickness of the incident side face and thickness of the opposite edge: 0.6 mm, the liquid crystal display apparatus was produced following Example 1.

EXAMPLE 6

Excepting that the light pipe was used of the tilt angle of the short side face in the prismatic roughness: 42.6 to 42.8 degrees, the tile angle of long side face: 6.3 to 9.5 degrees, the projected width to the lower surface of the short side face: 25 to 35 μm, and the ratio of the projected area to the lower surface of the long side face/the short side face: 5 to 7 times, the liquid crystal display apparatus was produced following Example 2.

EXAMPLE 7

Excepting that the light pipe was used where the polyester film of 50 μm thickness was used to the base material of the light diffusion sheet, and the amount of the leakage light by depolarization was 5.3% of all the incident light, the liquid crystal display apparatus was produced following Example 3.

Evaluation Test

As to Examples 1 to 7, the front brightness was measured with a luminance meter (made by Thompson Inc.) under the white displaying condition in the transmission mode and the reflection mode of the liquid crystal display apparatus. The transmission mode was evaluated by lighting on the light source in a dark room, while the reflection mode was turning light off in the dark room, and a ring-shaped illuminator was placed at a position 10 cm above the center of the apparatus and was lighted.

|  |  | Ex.1 | Ex.2 | Ex.3 | Ex.4 | Ex.5 | Ex.6 | Ex.7 |
|---|---|---|---|---|---|---|---|---|
| Front brightness (cd/m$^2$) | Transmission mode | 401 | 378 | 384 | 336 | 100 | 249 | 204 |
|  | Reflection Mode | 998 | 1100 | 952 | 742 | 699 | 783 | 580 |

From the Table, it is seen that Examples 1, 2 and 3 accomplished the excellent bright displays in both modes of transmission and reflection. In particular, the brightness is more or less low, but excellent in uniformity of brightness in both modes and is very delicate.

In contrast, Example 4 goes down in the brightness, which is assumed to be caused by the absorption loss by the polarizer added to the visually recognizing rear side. Example 5 considerably goes down in the brightness, which is assumed to be caused by large disturbance of the emitted light from the light pipe and shortage of the quantity of light thereby. In Example 6, the nearer the light source, the more the bright, and dispersion of the brightness is large and the uniformity lacks. Example 7 is poor in the brightness, unnatural coloring occurs depending on vision, and the display was difficult to see owing glittering. This is assumed to be caused by dissolving the polarization characteristic owing to diffusion.

As mentioned above, it is seen that the light-on/light-off of the light source can be switched by on/off of the electric source, and in both modes of transmission and reflection of Examples 1 to 3, the liquid crystal display apparatus showing the good displaying characteristic is realized, and by using together with the reflection mode, the consuming electric power is saved, thereby to largely extend the using time of battery of such as mobile type display apparatus.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A liquid crystal display apparatus comprising:
   a light pipe for emitting an incident light coming from a light source from a lower surface via a light emitting means formed on an upper surface;
   a reflection type polarizer disposed on the lower surface of said light pipe, said reflection type polarizer dividing the incident natural light coming from the light source via the light emitting means and emitted from the lower surface of the light pipe into a circularly polarized reflected light and a transmitted light, and the reflected light being emitted through the upper surface of said light pipe; and
   a liquid crystal shutter disposed on the upper surface of said light pipe, and having a liquid crystal cell and at least one sheet of polarizer.

2. A liquid crystal display apparatus according to claim 1, wherein the reflection type polarizer is closely and integrally attached to the lower surface of the light pipe.

3. A liquid crystal display apparatus according to claim 1, wherein the light source can turn light on and off.

4. A liquid crystal display apparatus, wherein the light emitting means at least comprises an oblique face and a flat plane, said oblique face in which the light pipe is opposite at its upper surface to the incident side and has the oblique face tilting 35 to 45 degrees with respect to a reference flat plane of the lower surface, and said flat plane in which a crossing angle with the reference flat plane is 10 degrees or less and a projected area with respect to the reference flat plane is 8 times or more of the projected area of said oblique face.

5. A liquid crystal display apparatus as set forth in claim 1, wherein light emitting means on the upper surface of the light pipe comprises a structure repeating pitches of 50 $\mu$m to 1.5 mm of continuous or discontinuous prismatic structures composed of a short side face and a long side face, said short side face comprises an oblique face tilting at tilt angle of 35 to 45 degrees with respect to a reference flat plane of the lower surface from the incident side face toward an opposite edge side, and said long side face falls within tilt angle of more than 0 degree to 10 degrees with respect to said reference flat plane, in which the whole difference in angle is within 5 degrees, difference in angle in relation with a nearest long side face is within 1 degree, and a projected area to the reference flat plane is 5 times or more of the projected area of the short side face.

6. A liquid crystal display apparatus as set forth in claim 5, wherein the repeating pitches of prismatic structures are fixed.

7. A liquid crystal display apparatus according to claim 5, wherein the short side face of the prismatic structures has the projected width of 40 $\mu$m or less with respect to the reference flat plane.

8. A liquid crystal display apparatus according to claim 5, wherein a ridged line direction of the prismatic structures is within ±35 degrees with respect to the reference flat plane of the incident side face.

9. A liquid crystal display apparatus according to claim 5, wherein the projected area to the reference flat plane is 10 times or more of the projected area of the short side face.

10. A liquid crystal display apparatus according to claim 5, wherein the projected area to the reference flat plane is 15 times or more of the projected area of the short side face.

11. A liquid crystal display apparatus according to claim 1, wherein the light pipe passes the incident light from the lower surface at 90% or more of total light transmissivity.

12. A liquid crystal display apparatus according to claim 1, wherein the reflection type polarizer includes at least cholesteric liquid crystal layer.

13. A liquid crystal display apparatus according to claim 1, wherein the reflection type polarizer includes one kind or two kinds or more of multi layer film of double refractive organic film and ¼ wavelength plate.

14. A liquid crystal display apparatus according to claim 1, including a light diffusion layer of polarization maintaining property between the reflection type polarizer and the liquid crystal cell.

* * * * *